Feb. 16, 1943. S. M. BACKSTROM ET AL 2,311,512
REFRIGERATION
Filed Sept. 18, 1939 4 Sheets-Sheet 2

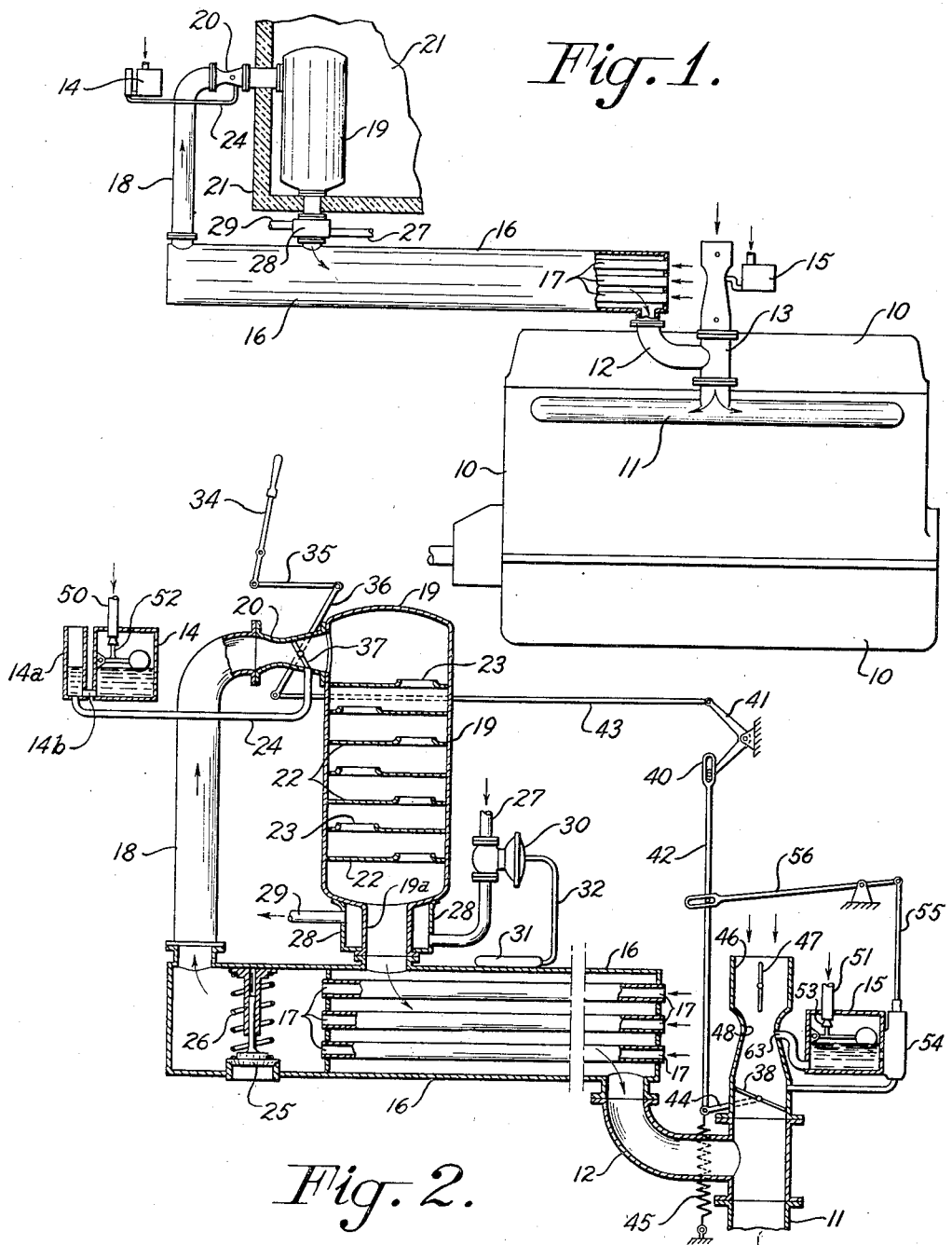

INVENTORS
Sigurd Mattias Backstrom
Per Paul Strandberg
BY D. E. Heath
their ATTORNEY.

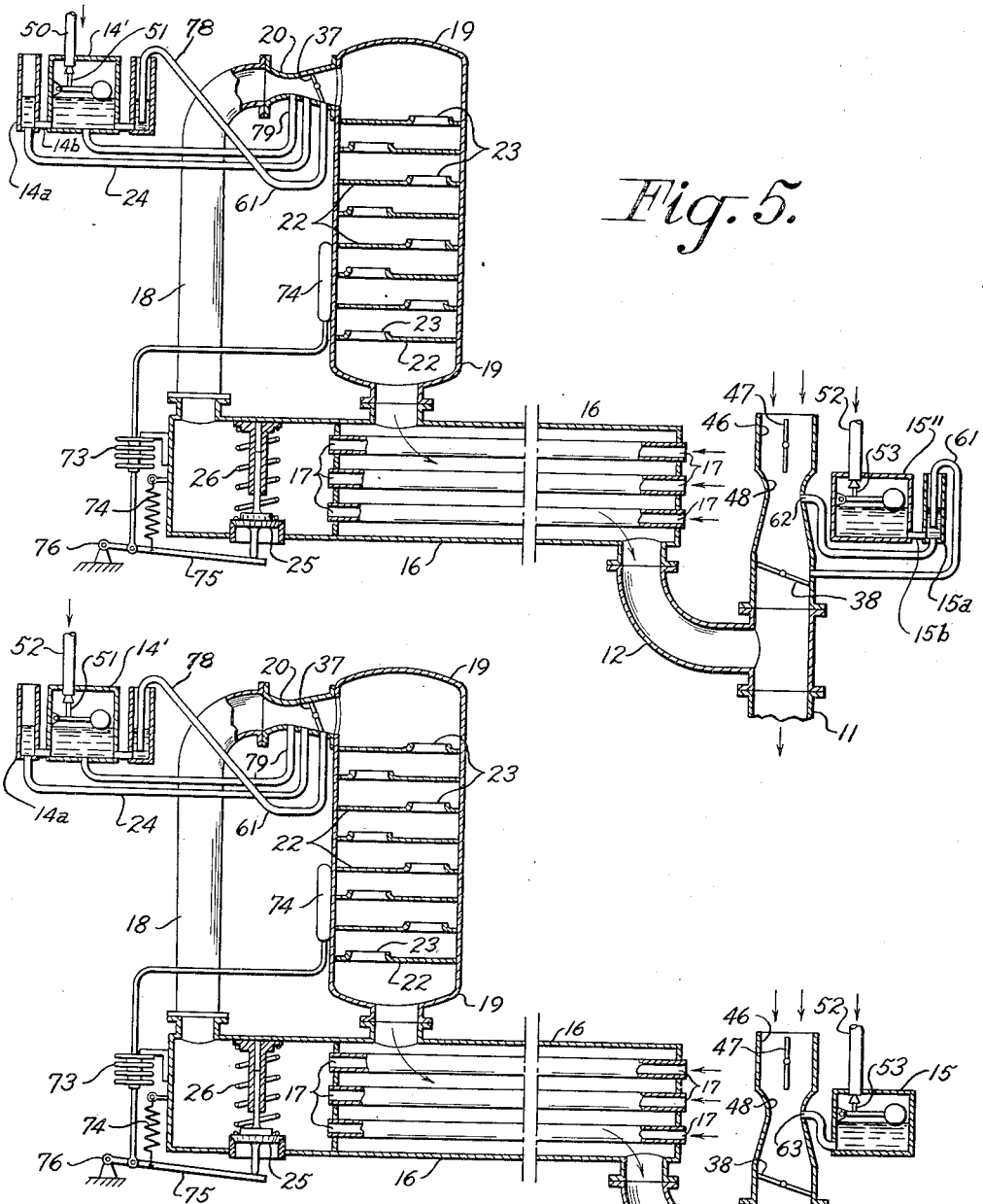

Feb. 16, 1943.   S. M. BACKSTROM ET AL   2,311,512
REFRIGERATION
Filed Sept. 18, 1939   4 Sheets-Sheet 4

INVENTORS
Sigurd Mattias Backstrom
Per Paul Strandberg
BY D. E. Oleath
their ATTORNEY.

Patented Feb. 16, 1943

2,311,512

UNITED STATES PATENT OFFICE 2,311,512

REFRIGERATION

Sigurd Mattias Backstrom and Per Paul Strandberg, Stockholm, Sweden, assignors, by mesne assignments, to Servel, Inc., New York, N. Y., a corporation of Delaware Application September 18, 1939, Serial No. 295,420
In Germany March 31, 1939

14 Claims. (Cl. 62—169)

Our invention relates to a method of and apparatus for producing refrigeration in connection with internal combustion engines, particularly engines used for the operation of vehicles such as automobiles, motor-boats, motor railways, or in connection with stationary engines, and in which vaporizable motor fuel is used as the refrigerant.

It is an object of our invention to provide a system having great flexibility both with respect to operation of the engine and the refrigeration system, and in which the output of the refrigeration system may be maintained relatively constant regardless of change of load upon the internal combustion engine, and in which refrigeration may be produced directly upon the starting of the engine, or produced at any time subsequent to the starting of the engine.

It is a further object of our invention to provide automatic means rapidly to eliminate ice which may form in the system to the detriment of both engine performance and operation of the refrigeration system.

In carrying out our invention in one form thereof, we provide a plurality of carburetors arranged jointly or independently to supply a mixture of fuel and air to the intake manifold of an internal combustion engine. From one or more of the carburetors liquid fuel is supplied to a cooling element or evaporator in which the vaporization of the fuel produces absorption of heat and cooling. Further in accord with our invention the carburetor delivering the fuel to the evaporator may form the principal source of fuel for the engine or it may supply only a minor part of the fuel consumed. Vapors and air leaving the evaporator preferably pass in heat exchange with air entering the evaporator and in addition a separate supply of air and fuel may pass directly from another carburetor to the engine. In the event of frost or ice forming within the heat exchanger, means are provided for the introduction of warm air quickly to melt the ice or frost.

The invention, together with other objects and advantages thereof, will be more fully understood upon reference to the following description and the accompanying drawings forming a part of this specification and of which:

Fig. 1 shows more or less diagrammatically a refrigeration system combined with an internal combustion engine in accordance with the invention;

Fig. 2 illustrates the arrangement of Fig. 1, partly in section, and with additional elements included;

Fig. 5 illustrates more or less diagrammatically a still further modification of the invention in which a main carburetor supplies fuel to the engine through a cooling element, and an auxiliary carburetor supplies fuel directly to the engine;

Fig. 6 illustrates more or less diagrammatically a modification of the invention of somewhat more simplified form than the one of Fig. 5;

Figures 3, 4:
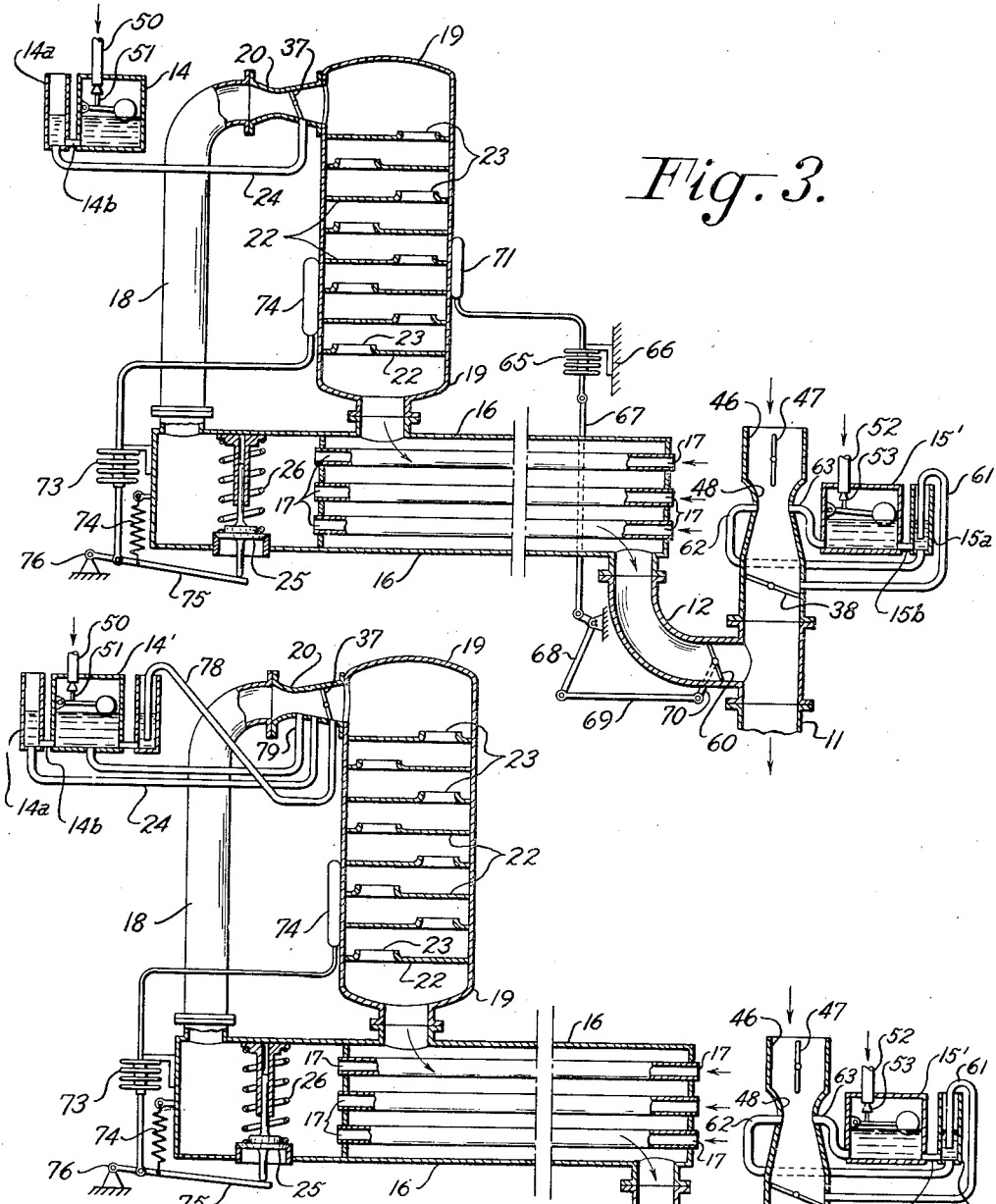
Fig. 3 shows more or less diagrammatically a refrigeration system embodying a modification of the invention and including temperature control means.
Fig. 4 is a view similar to Fig. 3, showing a refrigeration system embodying a further modification of the invention in which either or both of two carburetors may control engine operation.

Referring to the drawings, particularly to Figs. 1 and 2, we have shown the invention in one form as applied to an internal combustion engine 10, having an intake manifold 11 into which a combustible mixture of fuel and air may be delivered by one or both of conduits 12 and 13, respectively under the control of carburetors 14 and 15. Between conduit 12 and carburetor 14 there is provided a refrigeration apparatus and system which consists of a gas heat exchanger 16, having a plurality of air-receiving conduits or passageways 17 which, through the left-end of exchanger 16, as viewed in Figs. 1 and 2, connect with conduit 18, and thence to the cooling element or evaporator 19 through a Venturi tube 20. The cooling element 19 may be used as a component part of an air conditioning or cooling system, to provide car-refrigeration, or to cool a heat-insulated refrigerator compartment 21. The cooling element 19 though it may be of any suitable configuration is shown in the form of a vessel having a plurality of baffles or trays 22, Fig. 2, through staggered openings 23 of which the refrigerant comprising motor fuel may flow. Each opening 23 has an upturned edge so that some liquid refrigerant or fuel may be retained on each tray before it flows to the succeeding tray. Since the cooling element 19 is by heat exchanger 16 and conduit 12 connected to intake manifold 11, the suction produced by operation of the pistons of the engine 10 reduces the pressure within evaporator 19. The motor fuel introduced by way of jet 24 and used as the refrigerant, during vaporization cools the element 19, and is then delivered to the engine 10 in mixture with air or other combustion supporting gas; and in mixture with air and fuel from carburetor 15, as more fully explained hereinafter. In the heat exchanger 16, incoming air is cooled by the vapor and air leaving the evaporator 19.

Since the air introduced through the tubes 17 of the heat exchanger 16 generally includes some moisture, and with air at a relatively high humidity containing a substantial percentage of water vapor, low temperatures in the heat exchanger 16 may freeze or solidify the water vapor in the tubes 17. If the freezing were to continue indefinitely, the frost or ice would completely close or stop the tubes 17. As soon as the ice or frost decreases the quantity of air flowing into the evaporator, means responsive to the difference of pressure in the evaporator and that of the atmosphere functions to open a relatively warm air inlet into the evaporator 19. The warmer air passing through exchanger 16 melts the accumulated ice or frost, and returns the system to normal operating conditions. In one form of the invention the differential pressure responsive means comprises a valve 25 biased to closed position by a spring 26 encircling the valve assembly which is disposed in the left-hand end of the heat exchanger 16, as viewed in Fig. 2. As ice or frost clogs the tubes 17 engine operation lowers the pressure within the heat exchanger 16, and as soon as it becomes low enough for the higher atmospheric pressure to move the valve 25 against the spring 26 to open position, the warmer ambient or atmospheric air flows directly by way of conduit 18 and Venturi tube 20 through the evaporator 19, and around and in heat exchange with the ice-clogged tubes 17. The warmer air melts the ice or frost. The result is a rise in the pressure within the heat exchanger 16 and upon the occurrence of that rise the differential of pressure diminishes and the spring 26 is effective to move the valve 25 to a closed position. Additionally to free the tubes 17, from frost or ice, exhaust gases from the engine 10 or any suitable heating fluid may flow through a conduit 27 into a heating jacket 28 encircling the outlet 19a from the evaporator 19, the exhaust gases or fluid being discharged through conduit 29. Interposed in conduit 27 is a thermostatically operated valve 30 of any suitable type which functions to admit the exhaust gases whenever the temperature of the heat exchanger 16 decreases below a predetermined value. As shown, the valve 30 may be operated by an expansible bellows, or diaphragm (not shown) as the result of the expansion of a suitable fluid contained in bulb 31, itself in temperature responsive relation to the exchanger 16 and connected to the valve 30 by capillary tube 32.

In the operation of this embodiment of the invention it is assumed that the engine 10 is to be started. The throttle 34, shown in the closed position in Fig. 2, is moved clockwise to a starting position and through links 35 and 36 moves the butterfly or throttle valve 37 in counterclockwise direction towards its open position. In the starting position, the throttle 34 has not moved the butterfly or throttle valve 38 of the carburetor 15 from its closed position by reason of a lost motion connection 40 interposed between a crank-arm 41 and link 42. One arm of the crank is by link 43 connected to the link 36, and the other arm is by link 42 connected to the link 44 which operates the butterfly valve 38. The latter is preferably biased to its closed position by a spring 45. The engine is now rotated by hand or by any suitable starting device, and as is well understood, the pistons function to draw a combustible mixture of air and fuel into the cylinders for subsequent compression and ignition. The suction produced by the cylinders causes flow of air through the tubes 17, the conduit 18, and Venturi tube 20. Instead of the venturi any other form of ejector or injector may be used. As shown, however, the rapid flow of air through the constriction of the venturi withdraws fuel from an auxiliary compartment or chamber 14a of carburetor 14, quickly emptying it into evaporator 19. The auxiliary chamber 14a, open to the atmosphere, is of sufficient size to supply adequate fuel for a rich starting mixture. The raw or liquid fuel as emptied into the evaporator 19 is held in shallow pools on the trays 22 and only the rich vapors pass in mixture with the air to the engine 10. The collection of fuel on the trays prevents raw fuel from flooding the engine. In addition to the fuel withdrawn from the small storage compartment 14a, additional motor fuel thereafter flows from the carburetor 14 by way of a jet 14b of a size which limits the supply of motor fuel. After movement of the butterfly valve 37 to beyond the starting position the jet may be of a size which will not deliver sufficient motor fuel to produce an explosive mixture, suitable for operating the engine under load.

Now assuming that the engine 10 has been successfully started, the load or speed thereof may be increased by moving the throttle 34 towards open position. As the butterfly or throttle valve 37 approaches a position for the admission of air in excess of that quantity which produces a suitably explosive mixture with the fuel delivered by jet 14b, the crank-arm 41 is effective to initiate the opening of the butterfly valve 38 of the main carburetor 15. Air admitted through inlet 46 flows past choke valve 47, through constriction 48 and into the engine. The constriction 48 of a Venturi tube serves to withdraw from carburetor 15, motor fuel which is atomized and introduced in mixture with the air to the engine 10. The carburetors 14 and 15 may be supplied with any suitable vaporizable motor fuel, such for example, as petrol or gasoline from one or separate tanks, by way of inlet conduits 50 and 51 controlled by float-operated needle valves 52 and 53. The load or speed of the engine may be further increased by additional movement of the throttle 34 towards the open position, the effect of which is to introduce additional air by way of conduits 17, 18, and 12, and additional fuel and air by way of the carburetor 15. The carburetor 15 is adjusted so that the fuel delivered into the Venturi tube 48 produces a mixture too rich in motor fuel for proper combustion, but this excess of fuel is compensated for by the excess of air introduced through tubes 17 and conduits 18 and 12. In consequence, the engine 10 at all times receives a mixture which is ideally suited for the particular operating conditions.

The system is effective from the initial starting of the engine to produce refrigeration. The flow of air through the evaporator 19 causes the fuel therein to evaporate or diffuse thereby cooling and lowering the temperature of evaporator 19. Since the jet 14b limits the rate of flow of fuel into the cooling element or evaporator 19, the capacity of the system is limited, which is advantageous for those cases where there exists a relatively constant refrigeration load, as for example exists in the transportation by refrigerated cars or trucks of merchandise which is to be maintained at a fixed low temperature.

Where operating conditions require rapid change in load or speed of the engine 10, the main carburetor 15 may be provided with an accelerating pump 54, operable by links 55, 56 and 42, in a manner well understood by those skilled in the art, to introduce directly into the manifold 11 an additional limited charge of motor fuel.

By moving the throttle lever 34 counter-clockwise towards its closed position, the above sequence of operations is carried out in reverse order. The throttle valve 38 of the main carburetor 15 is gradually moved to a closed position to reduce the fuel supply or quantity of explosive mixture delivered into the inlet manifold 11, and the throttle valve 37 of carburetor 14 reduces the quantity of air flowing through conduit 12 without changing the flow of fuel. As the throttle 34 approaches the idling position, the richness of the mixture has been increased, and when idling position is reached the valve 38 arrives in its fully closed position, as shown in Fig. 2. To stop the fuel supply entirely, valve 37 may thereafter be moved to its closed position. Efficient engine operation is obtained at all times, since the proportion of air and motor fuel is automatically regulated for best engine performance, and refrigeration is continuous.

In accord with the invention, as exemplified in Fig. 3, the engine can be started either with or without the production of refrigeration by the cooling element 19. This modification of the invention is generally similar to the one shown in Figs. 1 and 2, and corresponding parts in all figures of the drawings bear the same reference characters.

In describing the operation of the system of Fig. 3, it is first assumed that a butterfly valve 60, disposed in conduit 12, is in its fully closed position effectively to render inoperative the refrigerating system, including the auxiliary carburetor 14. In starting the engine the choke valve 47 of the main carburetor 15' may be moved to closed position to decrease the amount of air delivered to the inlet manifold 11, thereby to increase the proportion of fuel, or richness of the mixture. At the same time the main throttle valve 38 of the main carburetor 15' is by the throttle moved towards its open position. Upon rotation of the engine, the lowered pressure in the inlet manifold 11 produces rapid flow of air through the constriction or throat 48. The lowered pressure also causes liquid fuel to rise from an auxiliary chamber 15a into a siphon 61 connected for delivery of motor fuel into the manifold 11. This siphon is then effective to empty into manifold 11 the relatively small amount of motor fuel in the auxiliary chamber 15a, thereby insuring a mixture rich in motor fuel for the starting operation. Simultaneously motor fuel flows from the jets 62 and 63, the first being connected to the auxiliary chamber 15a and the second being connected to the main chamber of the carburetor 15'. To limit the flow of motor fuel into the auxiliary chamber 15a a jet 15b is provided of a size which restricts to a desired degree the flow into the auxiliary chamber.

After the engine has been started, refrigeration can be produced at any time by opening the butterfly valves 60 and 37, respectively interposed in conduits 12 and 18. Though these two valves may be operated independently of each other, or only one of them used, we prefer to operate them simultaneously, as by interconnecting linkage, not shown.

In accord with the invention as embodied in the system of Fig. 3, the temperature of the cooling element or evaporator 19 may be automatically controlled by opening and closing of the valves 37 and 60. This can be done by providing an expansible bellows 65, supported at 66 for automatic control of the valve 60 through link 67, crankarm 68, and links 69 and 70. The expansible bellows 65 may be operated by expansion of a suitable fluid contained in the bulb 71 disposed in heat exchange with the evaporator 19. As the temperature of the evaporator 19 rises, the fluid expands causing the expansible bellows 65 to lengthen and, through the linkage 67—70, move the valves 60 and 37 towards open position. The result is an increased flow of motor fuel from the auxiliary carburetor 14 by way of jet 24 into the evaporator 19. As described above, the diffusion and evaporation of the motor fuel into the air entering the evaporator 19 through the conduit 18 produces cold.

Further to control the temperature of the evaporator 19, either in conjunction with, or as an alternative to, the control exerted by the bellows 65, there may be provided an expansible bellows 73, operable by a suitable fluid contained in a bulb 74, also in heat exchange with the evaporator 19. As the temperature of the evaporator 19 decreases, a spring 74 is effective to compress the bellows 73 and by a link 75, pivoted at 76, moves the valve 25 to open position, thereby admitting warm ambient air into the evaporator 19. The spring 74 is more powerful than the spring 26 so that this operation may be readily effected. As the temperature of the evaporator rises, the expansible bellows 73 expands against the bias of spring 74 and the spring 26 becomes effective to move the valve 25 to closed position.

Further in accord with the invention as exemplified by the system of Fig. 4, both of carburetors 14' and 15' may be provided with all necessary adjuncts for the starting and the operation of the engine under widely varying conditions of operation. For example, the carburetor 14' in addition to the starting jet 24 may be provided with a siphon 78, operable upon decrease in pressure within the venturi 20 to deliver motor fuel directly into the evaporator 19, and a main jet 79 may be connected from the venturi to the main chamber of the carburetor 14'. In this system, the main valve 38 of the carburetor 15' may be retained in its closed position during starting and normal operation of the engine. The valve 60 in conduit 12 may be manually operated and by friction means retained in open position. The engine operation is then entirely under the control of the main valve 37 of the carburetor 14'. Immediately upon starting the engine and during its operation, refrigeration is produced by the evaporator 19. Automatic temperature control of the evaporator 19 or compartment, or object to be cooled, may be obtained by means of the expansible bellows 73 operating to control the opening and closing of the valve 25. In all modifications of our invention utilizing the valve 25, it should be observed that the relative richness of the mixture to the engine is not changed upon the operation of the valve 25. Its effect is merely to introduce the warm ambient air into the evaporator 19 for temperature control thereof, rather than air which has been cooled in the exchanger 16.

While it is contemplated that temperature control can also be obtained by dependent operation of carburetors 14' and 15', as by opening the main valve 38 at the same time as valve 37 is closed, whereby the amount of motor fuel evaporated or diffused into the air in cooling element 19 is decreased per unit of time, we prefer to utilize the carburetor 14' alone for starting the engine and for carrying its normal load. For peak loads or unusually high loads, the carburetor 15' is then rendered effective by the opening of its main valve 38, as by the engine throttle, not shown in this figure. Whenever the cooling system is to be rendered inoperative the valve 60 is moved to closed position by the manually operated lever 80 and the engine then controlled entirely by the carburetor 15'. The throttle is then connected to control directly the main valve 38 of carburetor 15'.

When the refrigeration load is to be substantial, we prefer to utilize the system shown in Fig. 5. The engine can be started either with the main carburetor 14', identical with the one described in connection with Fig. 4, or with the auxiliary carburetor 15" which is provided with the auxiliary chamber 15a and siphon 61 leading directly into the inlet manifold 11 and by means of which a predetermined amount of fuel may be directly introduced into the mixture entering the engine during the starting period. Preparatory to starting the engine, the main valve 38 of carburetor 15" is moved towards its open position, and the choke valve 47 moved towards closed position further to increase the richness of the starting mixture of air and motor fuel. Since the main carburetor 14' is also provided with the siphon 78, the auxiliary chamber 14a, and jets 24 and 79, it is obvious the valve 38 may remain in the closed position and the engine started and operated entirely under the control of the main valve 37 of the carburetor 14'. However, after the engine is started under the control of either of the carburetors 14' or 15', we prefer to utilize the carburetor 14' for control of the operation of the engine during normal load or operating conditions. For peak loads and after movement of the main valve 37 to its fully open position, the valve 38 may then be operated to its open position to take care of the peak loads. As described in connection with Figs. 3 and 4, an expansible bellows 73 is provided for the automatic control of temperature of the cooling element 19 or the objects or compartment cooled thereby. Inasmuch as the larger part of the engine fuel is used as refrigerant, the capacity of the refrigeration system is correspondingly increased.

When the carburetor 14' is entirely relied upon for the starting and operation of the engine, the embodiment in Fig. 6 may be employed in which the carburetor 15 may be of extremely simple design, including only the single jet 63 which under the control of the valve 38 supplies fuel to take care of peak loads upon the engine. The cooling output can be regulated by the temperature control means including the expansible bellows 73.

Figure 7:
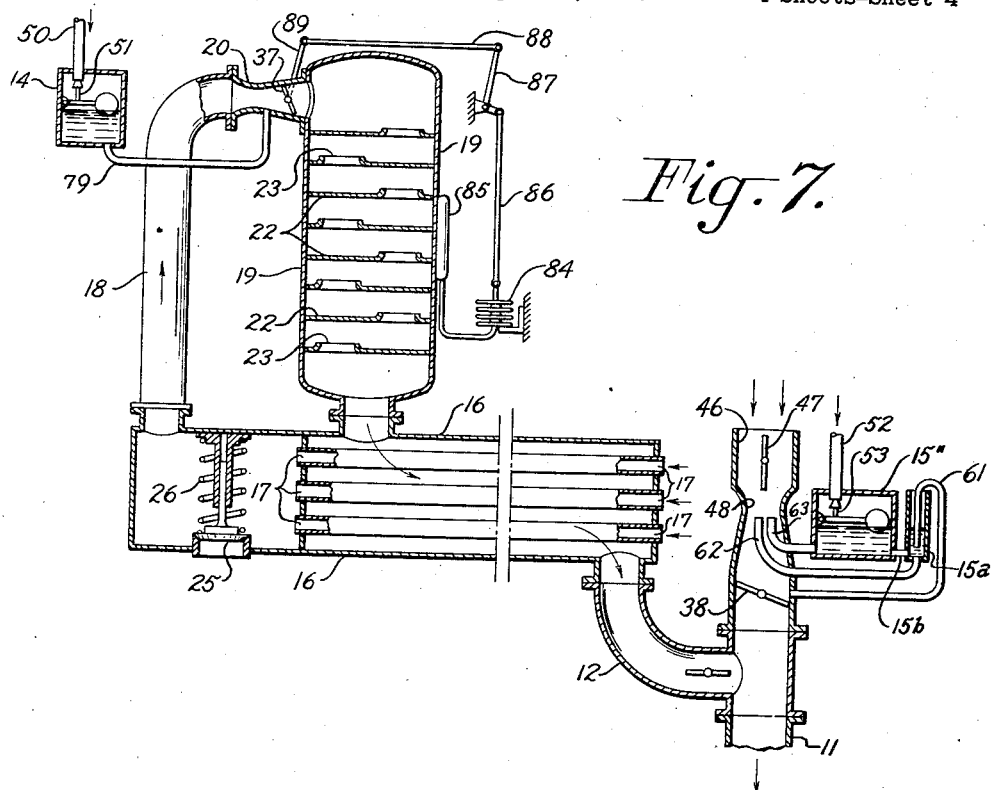
Fig. 7 illustrates more or less diagrammatically a modification of the invention in which the supply of fuel into the evaporator is controlled by the temperature thereof.

In accord with the invention as exemplified by Fig. 7, refrigeration is only produced when the engine is operating under substantial load. In this case the main carburetor 15" serves entirely for the starting of the engine and for its control. No cooling is effected by the evaporator 19 until after the engine has started. By suitable linkage between the main valve 38 and the auxiliary control valve 37, no refrigeration can occur until after the valve 38 has been opened a predetermined amount. Alternatively thermostatic means including an expansible and contractible bellows 84 with bulb 85 responsive to temperature of or in the region of, evaporator 19 may be arranged to operate, through link 86, crank-arm 87, and links 88 and 89, the valve 37, so that after the opening of the valve 60, the valve 37 is effective automatically to control refrigeration output in accord with the temperature of the evaporator or cooling element 19. In this manner the auxiliary carburetor 14 delivers motor fuel into the evaporator 19 in accord with the temperature requirements, and without regard to the load upon the engine. A system of this character is particularly effective in connection with marine engines, which are normally under relatively high load, and with respect to which the fuel supplied, or not supplied thereto by auxiliary carburetor 14 would not disadvantageously effect operation, and under some circumstances would not require compensating adjustment of carburetor 15".

As already explained, by the use of at least two carburetors, one complemental to the other, the efficiency of the internal combustion engine is to a large degree independent of the production of cold. Refrigeration may be produced at the maximum rate or the minimum rate without adversely affecting engine efficiency or fuel consumption. Regardless of wide variation in production of refrigeration and as a result of dependent operation of the carburetors, the mixture of air and fuel supplied to the engine at all times remains in proper ratio for maximum engine efficiency and performance.

Motor fuel such as gasoline is a complex mixture of hydrocarbons boiling over a fairly wide range of temperatures; and gasoline as sold in different parts of the country or in various parts of the world may widely vary in composition; particularly as to the proportion of the lighter, more volatile ends or components which are extremely valuable as part of the refrigerant for our refrigeration systems. Lack of vaporization of the heavier ends or components of the motor fuel within the evaporator at a given temperature may be compensated for by supplying an excess of air for vaporization of heavier ends, and compensation for the excess air is effected by simultaneously supplying excess fuel from the other carburetor.

Figure 8:
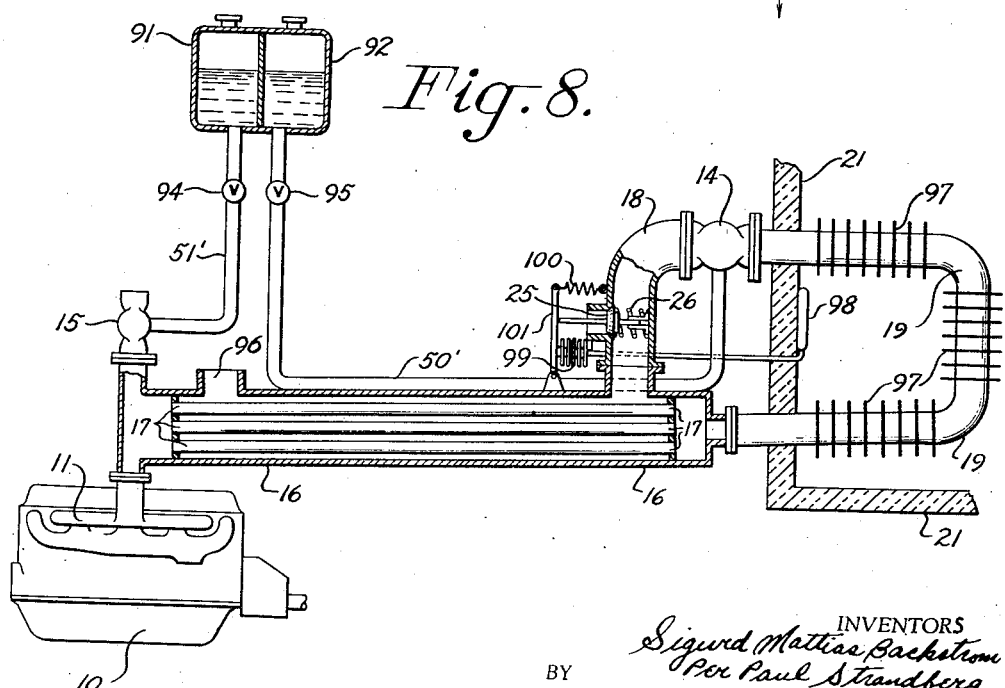
Fig. 8 illustrates more or less diagrammatically a modification of the invention in which a different temperature control is utilized.

In accord with the modification of the invention as shown in Fig. 8, each of carburetors 14 and 15 through conduits 50' and 51' may be supplied with fuel from separate sources of supply 91 and 92 so that a lighter, more volatile fuel may be supplied to carburetor 14 and a heavier, less volatile fuel to carburetor 15. The mixture to the engine 10 however, is adapted to best engine performance because of the dependent relation between the mixtures delivered by the carburetors to the manifold 11, which relation may be established by manual control of each carburetor. By means of valves 94 and 95 the engine 10 may be operated on the fuel from only one of the storage tanks 91 and 92. In order additionally to cool the fuel entering evaporator 19 the supply pipe or conduit 50' may be disposed in intimate heat exchange with exchanger 16, and with the air and vapors leaving the evaporator 19.

The several different features described in connection with the foregoing modifications may be utilized with any one of the systems illustrated. For example, in Fig. 2, the separate sources of supply or storage tanks 91 and 92 may be replaced by a single tank and in the other systems differing fuels may be supplied from separate tanks. The heat exchanger 16 may be vertically disposed or as shown in Fig. 8, it is preferably inclined toward the outlet to provide for drainage of unevaporated fuel from the evaporator 19 into the heat exchanger 16 and manifold 11, although vaporization thereof would occur before reaching the cylinders.

Air may be admitted through inlet 96 for passage around tubes 17 which carry air and fuel from the evaporator 19 to the engine. In Fig. 8, the evaporator is shown in the form of a conduit with radiating fins 97 and it may include baffles to assist in vaporization of the fuel-refrigerant.

As earlier described the air-inlet valve 25 operates in response to lowered pressure within the evaporator 19 to admit warm ambient air into evaporator 19 and thence into exchanger 16, to melt frost or ice present in the exchanger and around tubes 17. The valve 25 may also perform the function of a temperature-controller for the cabinet or compartment 21 within which the evaporator 19 is disposed. For a predetermined temperature the fluid within a bulb 98 maintains enough pressure in expansible bellows 99 to oppose spring 100 and to prevent operation thereby of lever 101 to open valve 25. As the temperature of bulb 98 decreases, the pressure on the bellows 99 falls and the spring 100 is effective to open valve 25. Conversely as the temperature of bulb 98 rises, the pressure on bellows 99 increases to reduce the bias of spring 100 on lever 101, so that spring 26 closes valve 25 and stops admission of ambient air directly into evaporator 19.

It is to be understood that additional precautionary measures may be taken against the formation of frost or ice, as for example around tubes, throttles, or valves, by providing additional heating means, such as electrical heating resistors; or the exhaust gases may be utilized in each location in the manner described in connection with the heating jacket 28 of Figs. 1 and 2, which surrounds the outlet 19a from evaporator 19.

Our invention is particularly characterized by the provision of refrigerating systems which are adapted to many varieties of engine applications and which provide maximum efficiency and flexibility in connection therewith. For example, in the operation of motor vehicles, such as automobiles, the internal combustion engine on the average is operated at about 25% of its maximum load, whereas for marine operation in boats, the average load on the engine is a much greater percentage of full load than for automobiles. On many stationary internal combustion engines the load may remain relatively constant, though in some applications it may from time to time vary through extremely wide limits. To provide refrigeration systems meeting the requirements of these various operations, we have provided systems having the desired capacity for the production of refrigeration with and without reference to engine load, and we have provided novel aspects of control of temperature thereof, and of operation of the engine, dependent upon concurrent control of one or more carburetors.

Various changes and modifications may of course be made so that the invention is not limited except as indicated in the following claims.

What is claimed is:

1. The combination with an internal combustion engine, of refrigeration apparatus comprising a cooling element, means for supplying to said element vaporizable fuel for said engine, a heat exchanger for producing heat exchange between air entering and a mixture of vaporous fuel and air leaving said element, and means responsive to a predetermined low pressure within said element for introducing therein air which has not been reduced in temperature by passage through said heat exchanger.

2. The combination with an engine, of refrigeration apparatus comprising a cooling element, means for supplying to said element vaporizable fuel for said engine, a heat exchanger for passing in heat exchange relation air entering and a mixture of vaporous fuel and air leaving said element, and means operable upon a predetermined decrease in flow of air through said heat exchanger for producing flow of air directly into said element.

3. The combination set forth in claim 2, in which said first-named means include a constriction for inducing flow of fuel into said element, and means whereby all air entering said element first flows through said constriction.

4. The method of refrigerating which comprises advancing a stream of vaporizable motor fuel to an internal combustion engine, producing a zone of low pressure through which said advancing stream passes, introducing air into said zone after passing in heat exchange relation with a mixture of vaporized fuel and air leaving said zone, and controlling in accord with drop in pressure of said zone below a predetermined pressure the introduction directly to said zone of air which has not been subjected to heat exchange with said mixture.

5. The method of refrigerating which comprises advancing a stream of vaporizable motor fuel to an internal combustion engine, producing a zone of low pressure through which said advancing stream passes, introducing air into said zone after passing in heat exchange relation with a mixture of vaporized fuel and air leaving said zone, and, upon the formation of frost or ice which impedes air flow through said zone of heat exchange, melting said ice or frost by introducing directly into said zone of low pressure warmer air which has not passed in heat exchange relation with said mixture.

6. The method of refrigerating which comprises advancing a stream of vaporizable motor fuel to an internal combustion engine, producing a zone of low pressure through which said advancing stream passes, introducing air into said zone after heat exchange with vaporized fuel and air leaving said zone, and, upon the formation of frost or ice which impedes air flow through said zone of heat exchange, melting said ice or frost by introducing directly into said zone of low pressure warmer air which has not been subjected to said heat exchange, and in accord with temperature change of said zone varying the flow of said warmer air into said low pressure zone to maintain a predetermined temperature thereof.

7. Refrigeration apparatus comprising an internal combustion engine, a plurality of carburetors, structure including said carburetors for conducting air and fuel to said engine, said structure including a cooling member connected between said engine and one of said carburetors, a heat exchanger for flowing a mixture of air and vaporous fuel passing from said cooling member in heat exchange relation with air flowing to said cooling member, and mechanism operable by the pressure differential within and outside of said cooling member for introducing air to said cooling member without flowing in heat exchange with the mixture of fuel and air passing from said cooling member.

8. Refrigeration apparatus comprising an internal combustion engine, a plurality of carburetors, connections for conducting combustion supporting gas and fuel from said carburetors to said engine, a cooling member provided in said connections between said engine and one of said carburetors, said one carburetor being so constructed and arranged that, upon starting of said engine, a limited quantity of fuel is supplied at a high rate for a given load on said engine and thereafter fuel is supplied at a normal lower rate for such given load, and said cooling element being arranged to retain the excess fuel supplied at a high rate by said one carburetor upon starting of said engine.

9. The method of refrigerating which comprises utilizing as refrigerant vaporizable fuel for an internal combustion engine, advancing two streams of fued to said engine, producing a region of low pressure by the action of said engine, introducing air and fuel from one of said streams into said region, vaporizing said fuel at said region to form a combustible mixture of air and fuel, supplying heat for said vaporization of said fuel from a body to be cooled, producing from said other stream a combustible mixture of fuel and air, concurrently supplying the engine with said mixtures produced from said two streams, the composition of one of said air and fuel mixtures being too rich and the other being too lean and the composition of the mixture of the two being suited in ratio of fuel to air for good operation of the engine.

10. The method of refrigerating which comprises utilizing as refrigerant vaporizable fuel for an internal combustion engine, advancing two streams of fuel to said engine, producing a region of low pressure by the action of said engine, introducing air and fuel from one of said streams into said region, vaporizing said fuel at said region to form a combustible mixture of air and fuel, supplying heat for said vaporization of said fuel from a body to be cooled, producing from said other stream a combustible mixture of fuel and air, concurrently supplying said engine with said mixtures produced from said two streams, said one stream supplying fuel and air in quantity and ratio to cause operation of said engine up to a predetermined load and said other stream supplying additional fuel and air to cause operation of said engine above said predetermined load.

11. The method of refrigerating which comprises utilizing as refrigerant vaporizable fuel for an internal combustion engine, advancing two streams of fuel to said engine, producing region of low pressure by the action of sa engine, introducing air and fuel from one of said streams into said region, vaporizing sai fuel at said region to form a combustible mixture of air and fuel, supplying heat for said vaporization of said fuel from a body to be cooled, producing from said other stream a combustible mixture of fuel and air, concurrently supplying said engine with said mixtures produced from said two streams, and introducing air of higher temperature into said region of low pressure when the pressure therein drops below a predetermined value.

12. Refrigeration apparatus comprising an internal combustion engine, a plurality of carburetors, connections for conducting combustion supporting gas and fuel from said carburetors to said engine, a cooling member provided in said connections between said engine and one of said carburetors, and mechanism including a single operating member for controlling said carburetors, said mechanism being so constructed and arranged that up to a predetermined load on said engine said one carburetor is regulated by said operating member, and, after said one carburetor is wide open and said predetermined load is reached, another of said carburetors is regulated by said operating member.

13. Refrigeration apparatus comprising an internal combustion engine, a cooling element, a heat exchanger having first and second passages, conduit means including the first passage of said heat exchanger for supplying air to said cooling element, means to supply fuel to said cooling element, conduit means including the second passage of said heat exchanger for conducting a mixture of vaporized fuel and air from said cooling element to said engine, said heat exchanger being subject to formation of frost or ice tending to clog said first passage through which air is supplied to said cooling element, and structure responsive to a temperature condition affected by said heat exchanger for utilizing exhaust gases discharged from said engine to effect melting of the frost or ice.

14. Refrigeration apparatus comprising an internal combustion engine, a cooling element, a heat exchanger having first and second passages, conduit means including the first passage of said heat exchanger for supplying air to said cooling element, means to supply fuel to said cooling element, conduit means including the second passage of said heat exchanger for conducting a mixture of vaporized fuel and air from said cooling element to said engine, said heat exchanger being subject to formation of frost or ice tending to clog said first passage through which air is supplied to said cooling element, and structure to cause melting of the frost or ice responsive to a temperature condition affected by said heat exchanger.

SIGURD MATTIAS BACKSTROM.
PER PAUL STRANDBERG.